F. S. ROWLAND.
Windlass.

No. 160,617.  Patented March 9, 1875.

WITNESSES:
Chas. Nida
A. F. Terry

INVENTOR:
F. S. Rowland
BY Munn & Co.
ATTORNEYS.

THE GRAPHIC CO. PHOTO-LITH. 39 & 41 PARK PLACE, N.Y.

UNITED STATES PATENT OFFICE.

FLETCHER S. ROWLAND, OF CHAPLIN, KENTUCKY.

IMPROVEMENT IN WINDLASSES.

Specification forming part of Letters Patent No. 160,617, dated March 9, 1875; application filed August 10, 1874.

*To all whom it may concern:*

Figure 1:
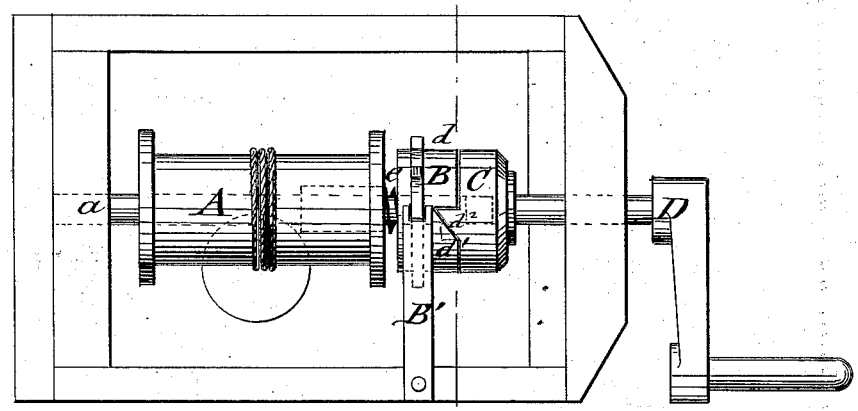
Figure 2:
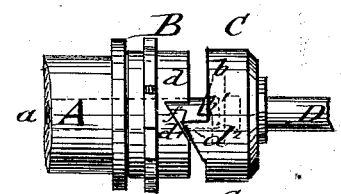
Figure 3:
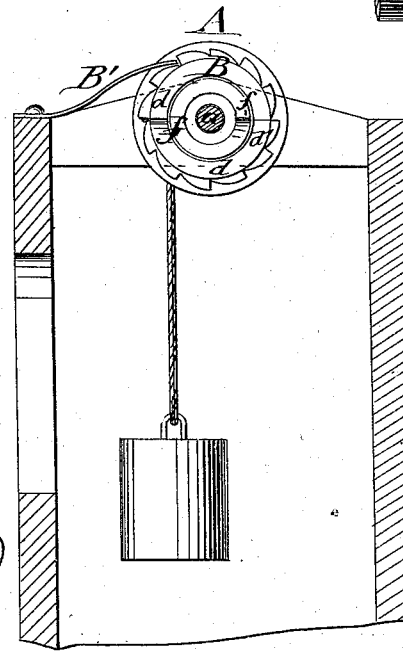
Figure 4:
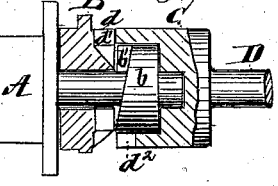

Be it known that I, FLETCHER S. ROWLAND, of Chaplin, in the county of Nelson and State of Kentucky, have invented a new and Improved Hoisting Apparatus, of which the following is a specification:

In the accompanying drawing, Figure 1 represents a top view of my improved hoisting apparatus; Fig. 2, a detail top view of the windlass and crank-connection; and Fig. 3, a vertical transverse section of the apparatus on the line $c\ c$, Fig. 1. Fig. 4 is a vertical section of the clutch mechanism.

Similar letters of reference indicate corresponding parts.

The object of my invention is to furnish an improved windlass or hoisting apparatus for raising and lowering weights, by which the descent of the platform, bucket, or hook may be accomplished with greater rapidity than the raising of the same, and kept under full control without giving the crank a reverse motion. My invention consists of such an arrangement of the loose and sliding ratchet-box with the windlass-shaft, and a separate crank shaft and clutch, that the windlass is turned for hoisting in the usual manner, while, for lowering, the clutch-connection is released and the descent controlled by the brake action of the ratchet-box.

In the drawing, A represents a windlass roller or drum, which turns on a shaft, $a$, provided near its end with a fast collar, $b$, having cams or inclined teeth $b'$. A ratchet-box, B, slides loosely on shaft $a$, and is acted upon by a pivoted pawl, B′. Box B has an outer cylindrical side flange, $d$, with recesses or notches $d^1$, and is acted upon by a spiral spring, $e$, placed on shaft $a$ between windlass A and ratchet-box B. It has also interior cams or inclined teeth $f$, set in opposite direction to those of the fast collar $b$, so as to interlock therewith when the teeth $d^2$ of a cylindrical flanged collar or clutch, C, of crank-shaft D enter the recesses $d^1$ of ratchet-box B, and turn the same on shaft $a$. The flanged collar C incases the fast collar $b$ of windlass-shaft, whose end is supported and rotated in a central socket-recess of collar D. The turning of the crank-shaft in forward direction for hoisting the load causes the coupling of the outer flanged collar and the ratchet-box, and also of the cams of the latter and those of the fast collar of the windlass-shaft, so that the turning of the loose ratchet-box produces the rotation of the windlass, the winding up of the rope or chain, and raising of the load. The crank cannot fly back and endanger the operator, as the pawl prevents the return motion of the ratchet.

For lowering the apparatus, the crank motion is slightly reversed, which causes the clutch C to rotate backward, and carries the teeth $d^2$ out of or partly out of the recesses $d^1$ in box B, the latter being prevented from rotating backward by means of the pawl B′; but neither the shaft of clutch C nor of drum A has endwise motion; hence the separation between the parts B C, as represented in Fig. 2, is caused by the sliding of B toward the drum A. This movement compresses the spring $e$ and increases the friction on A, thus enabling it to brake the drum as the rope unwinds and the bucket or other weight descends. The friction may be further increased by carrying the crank-shaft still farther back, so as to throw thereby the ratchet-box against the side of the windlass. Thus the descent of the load, platform, hook, or bucket is fully within the control of the operator, and may also be completely checked at any point, if desired. By turning the crank-shaft back into position for hoisting, the spiral spring carries the sliding ratchet-box back into position for coupling with the crank-clutch and the shaft-collar, forming thereby a very conveniently-operated labor-saving apparatus, as the time consumed for lowering is considerably reduced.

Having thus described my invention, I claim as new and desire to secure by Letters Patent—

The combination of windlass A, sliding ratchet-box B, pivoted pawl B′, clutch C, and friction-spring $e$, for producing brake action of the ratchet-box on the drum or windlass during descent of platform or other weight, as described.

FLETCHER S. ROWLAND.

Witnesses:
   G. S. ROSE,
   R. M. STANLEY.